April 4, 1961 M. N. FORDE 2,978,527
RAPID-RESPONSE THERMOELECTRIC GENERATOR
Filed Dec. 18, 1957
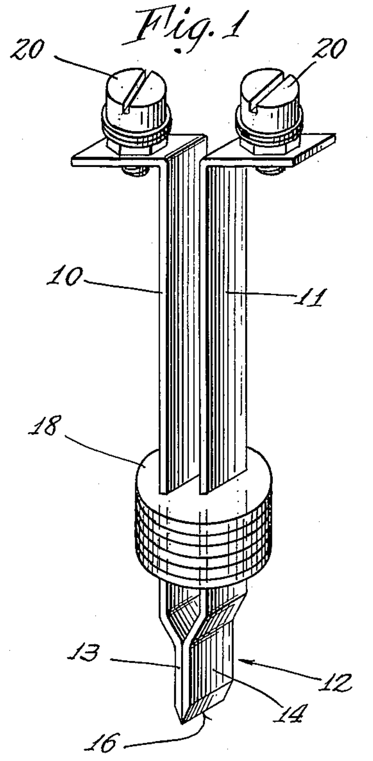
Fig. 2
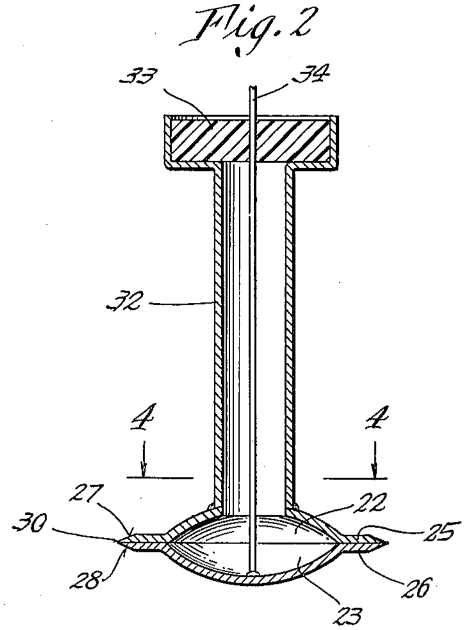
Fig. 4
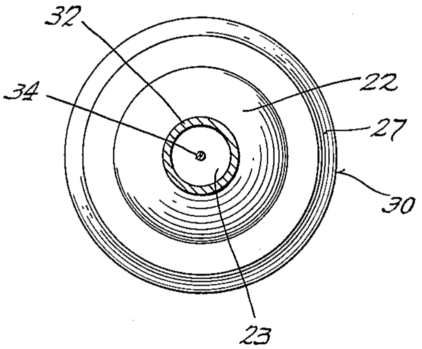
Fig. 3
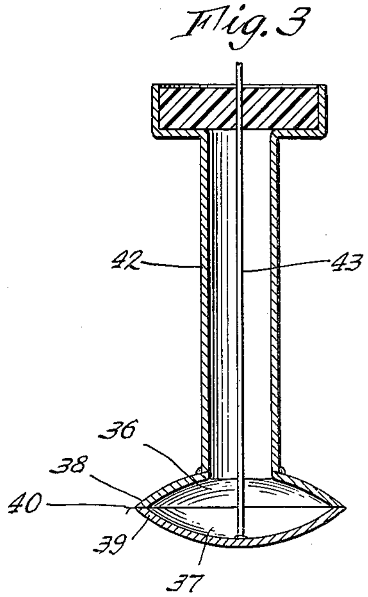
INVENTOR.
Milton N. Forde
BY
H Gibner Lehmann
AGENT 2,978,527

RAPID-RESPONSE THERMOELECTRIC GENERATOR

Milton N. Forde, Woodbridge, Conn., assignor to Lewis Engineering Company, Naugatuck, Conn., a corporation of Connecticut Filed Dec. 18, 1957, Ser. No. 704,225

2 Claims. (Cl. 136—4)

This invention relates to thermocouples or junction generators of the thermoelectric type.

With the advent of jet and other type engines for air-borne objects, wherein very high operating temperatures are encountered, and wherein extremely fast speeds are involved, it becomes increasingly important to employ equipment which will provide accurate and rapid response to changes in the high temperatures.

Heretofore, temperature-recording and other temperature-responsive equipment has employed thermoelectric generators or thermocouples comprising wires of dissimilar materials twisted and/or welded together, strips of dissimilar metals having welded or otherwise joined junctures, etc.

I have found that these prior thermocouples, while satisfactorily accurate and reliable for conditions which do not change rapidly, lose their effectiveness and usefulness when the rate of change exceeds certain limits.

The above drawback and disadvantage of prior thermocouples is obviated by the present invention, and accordingly one object of the invention is to provide a novel and improved thermoelectric generator or thermocouple which has an appreciably more rapid response characteristic.

A further object of the invention is to provide an improved thermocouple as above characterized, which is accurate in its output even when responding at such increased rate.

A feature of the invention resides in the provision of a novel and improved thermocouple having the above advantages and which is nevertheless extremely simple in construction and economical to fabricate.

Another feature resides in the provision of a couple of the above type, which has very low resistance.

Still another object of the invention is to provide a novel and improved thermocouple as above set forth, which has a relatively-long, useful life.

Other features and advantages will hereinafter appear.

In the drawings accompanying this specification, similar characters of reference indicate corresponding parts wherever possible in the several views, in which:

Figure 1 is a perspective view of an improved thermocouple made in accordance with the invention.

Fig. 2 is an axial sectional view of a different type of thermocouple made in accordance with the invention.

Fig. 3 is an axial sectional view of yet another type of thermocouple embodying the invention.

Fig. 4 is a transverse sectional view taken on line 4—4 of Fig. 2.

Referring first to Fig. 1, the improved thermocouple illustrated therein comprises two members 10 and 11 in the form of elongate flat strips which may, for example, be constituted of dissimilar metals. For example, the strip 10 may be of Chromel, while the strip 11 may be of Alumel. It will be understood, of course, that the strips 10 and 11 may be made of other metals, or may be made of suitable non-metallic materials.

In accordance with the invention, the strips 10 and 11 are so joined or fused together and shaped as to constitute a novel and improved junction, indicated at 12, characterized by a number of important advantages. In forming the junction 12, a relatively large end area 13 of the strip 10 may be offset laterally from the remainder, and a large area of the strip 11 offset laterally, such offset end portions being joined as by welding or fusing them together in any suitable manner, to cause the facing surfaces thereof to be intimately engaged with each other to the exclusion of scale, foreign matter or the like which would interfere with a thermoelectric effect.

In addition to the large surface or area of contact or engagement, the end portions 13 and 14 are seen to have appreciable thickness, in this case the same thickness as the remainder of the strips 10 and 11, and the lower extremities of the end portions are shaved or tapered, so as to form a sharp, common edge 16 which is located at and which defines the fused surfaces of the said end portions.

I have found that by so constructing and constituting a thermoelectric junction there is obtained an important and much more rapid response than is possible with the usual, prior type of thermocouples, and I attribute this rapid response in the main to the provision of the sharpened edge 16. Moreover, a thermocouple having such a junction may have an extremely long, useful life while still exhibiting such rapid response, by virtue of the relatively large areas of the portions 13 and 14 which are engaged and fused together, together with the appreciable thickness of such portions. When the thermocouple is subjected to high temperatures, the sharpened edge 16 may gradually wear away, but the sharpness thereof will always be maintained, and the operativeness of the thermocouple will not be impaired since there is appreciable reserve junction material available to permit such wearing away without disrupting or destroying the junction. I attribute the retention of the sharpened edge during the wearing away process to the increased hardness of the metals at the fused surfaces thereof. Therefore, since the sharpened edge 16 will not tend to become rounded or blunt, but instead will remain sharp during the wearing away of the junction portions, the rapid response characteristic is retained while at the same time the couple has a long and useful life. These characteristics and advantages, as just stated above, will also be found in greater or lesser extent, in modifications of the invention to be described below.

Referring further to Fig. 1, the strips 10 and 11 may be held in spaced, insulated relation to each other by suitable spacing washers 18, which may be of mica or other suitable material, and terminal screws 20 may be provided on the upper extremities of the strips 10 and 11, for the purpose of attaching leads.

Another embodiment of the invention, wherein much larger fused or junction areas are provided to effect a desirable, lowered resistance of the thermocouple, is illustrated in Figs. 2 and 4. Here the thermocouple comprises members 22 and 23 in the form of dished, disk-like bodies or plates. While both the members 22, 23 are shown as dished, one need not be, if this is desired. The members 22 and 23 are provided with flat peripheral portions or flanges 25 and 26 arranged to engage each other so as to constitute the thermoelectric junction. The flanges 25 and 26 may be welded, fused, or otherwise suitably joined, the said flanges having sharpened peripheral edges 27 and 28 respectively, providing an annular sharp edge 30 disposed at the junction of the fused surfaces of the disks. A tubular support 32 is secured to the member 22 and carries an insulating disk 33 through which a conductor 34 extends, said conductor being joined to the lower disk 23. The larger peripheral contacting portions 25 and 26 in this form of the invention provide a desirable, lowered junction resistance.

Another embodiment of the invention is illustrated in Fig. 3, wherein cupped disk-like members 36 and 37 have their peripheral portions 38 and 39 joined and fused together, such portions having a sharp peripheral edge 40 to provide the rapid response characteristic. The disk 36 is carried by a supporting tube 42 through which a conductor 43 extends, the latter being secured to the disk 37.

It will be readily understood from the foregoing that I have provided a novel thermocouple and junction therefor which is characterized by relatively large areas of contact or fused surfaces, and by appreciable thickness of the members backing up such surfaces, together with a sharpened juncture extremity by which there is obtained a rapid response characteristic and also an appreciably long useful life even though the sharpened edge wears away under conditions of high temperatures. Due to the construction which I have provided, the sharpened edge will remain as such and will not become rounded or blunt during such wearing away, thereby to preserve the rapid response characteristic of the thermocouple. Moreover, I have found that such rapid response is obtained even though there exists a relatively large area constituting the fused surfaces of the members, and despite the appreciable thickness of those portions of the members which are fused together.

Variations and modifications may be made within the scope of the claims and portions of the improvements may be used without others.

I claim:

1. A rapid response thermocouple comprising two plates disposed broadside to each other and adapted to be exposed to heat, said plates being of dissimilar materials and having outer, peripheral, mutually contacting portions of commensurate thickness which are fused together, the contacting and fused surfaces of said portions being integral with the inner portions of the plates and said contacting portions having tapered edges terminating in a long, sharp, common peripheral edge located at the said fused surfaces; electrical connector means connected to the said plates, said connector means comprising a coaxial conductor structure extending laterally in one direction from the plates, one plate having a centrally disposed opening and the other plate having a solid, imperforate central portion, said conductor structure including an outer tube joined to the edge portions of said opening and further including an inner conductor passing through the opening, said inner conductor being secured to the solid central portion of the other plate.

2. The invention as defined in claim 1, in which at least one of said plates has a dished formation, thereby to space the central portion of said one plate from the central portion of the other plate.

References Cited in the file of this patent

UNITED STATES PATENTS

| | | |
|---|---|---|
| 1,286,429 | Shindel | Dec. 3, 1918 |
| 1,561,593 | Brown | Nov. 17, 1925 |
| 2,187,949 | Noble | June 23, 1940 |
| 2,372,506 | Montz | Mar. 27, 1945 |
| 2,480,404 | Findley et al. | Aug. 30, 1949 |

FOREIGN PATENTS

| | | |
|---|---|---|
| 132,132 | Great Britain | Sept. 9, 1919 |
| 1,004,962 | France | Dec. 5, 1951 |